A. R. DODGE.
METER FOR MEASURING THE FLOW OF FLUIDS.
APPLICATION FILED MAR. 10, 1909.
1,087,931.
Patented Feb. 24, 1914.
6 SHEETS—SHEET 5.
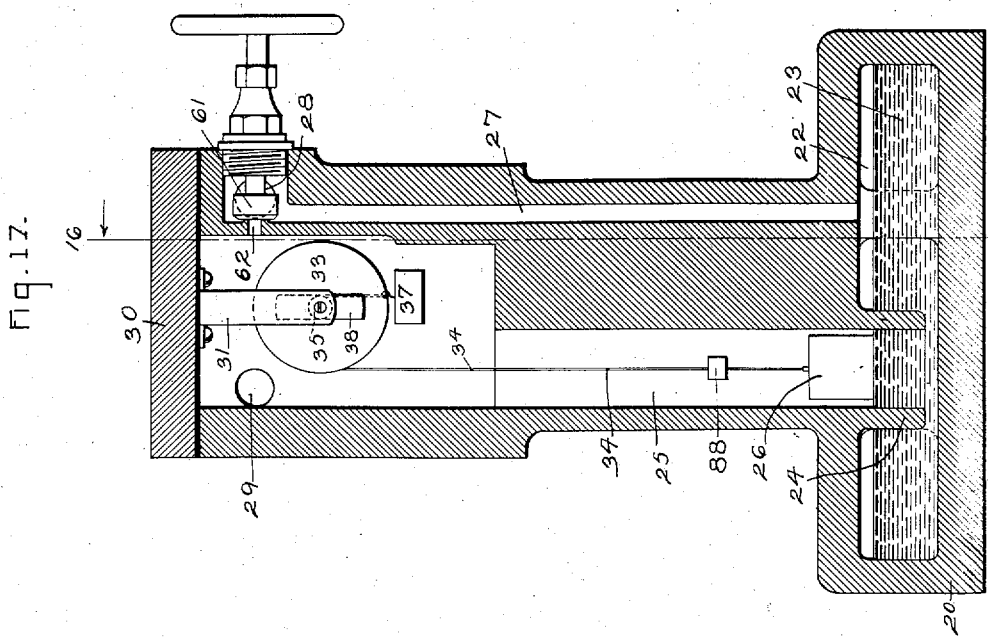
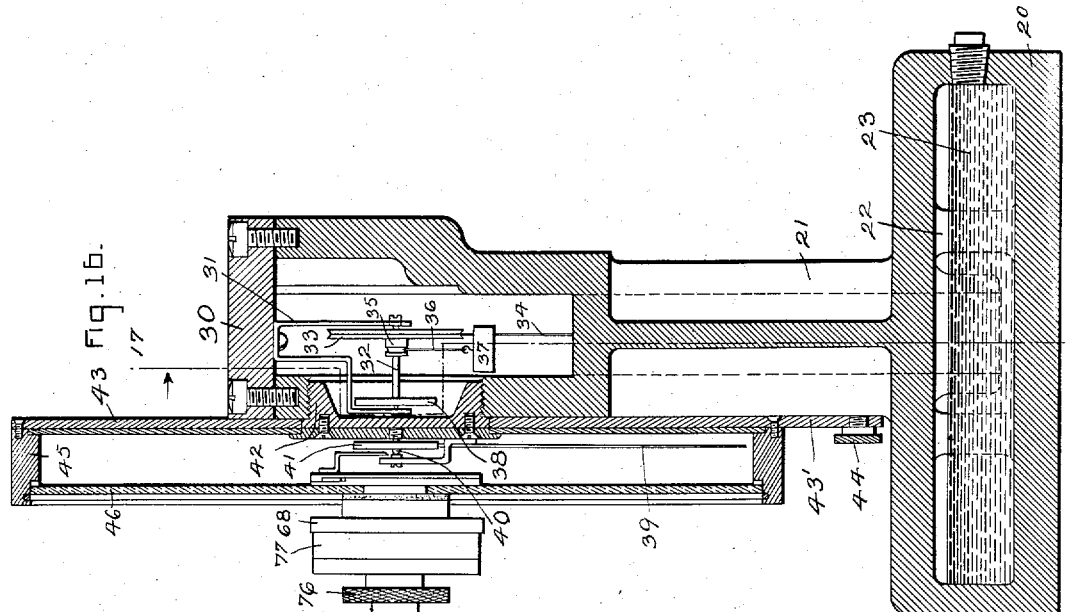
WITNESSES:
Benjamin B. Hull
Helen Oxford
INVENTOR:
AUSTIN R. DODGE
BY
ATTY.

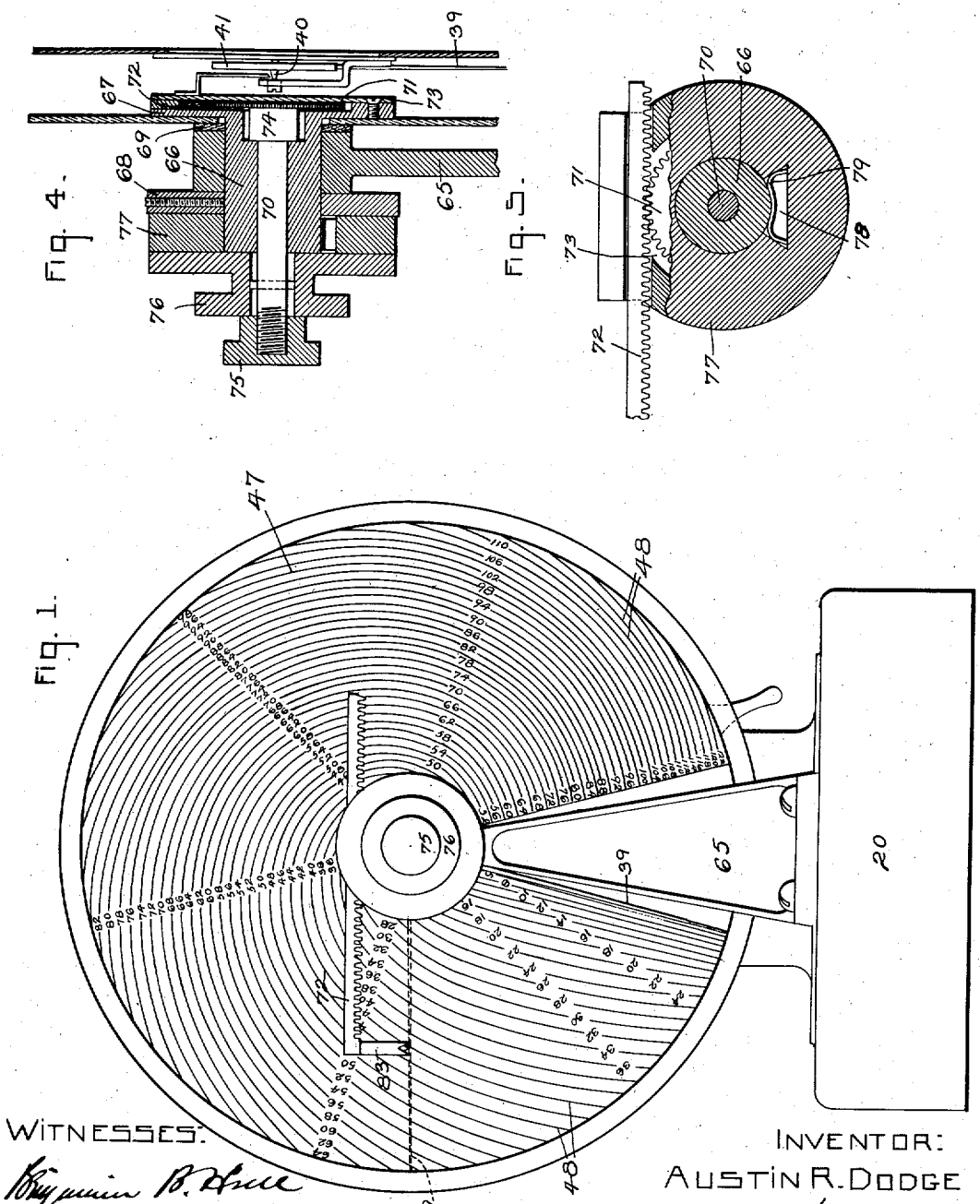
A. R. DODGE.
METER FOR MEASURING THE FLOW OF FLUIDS.
APPLICATION FILED MAR. 10, 1909.
1,087,931.
Patented Feb. 24, 1914.
6 SHEETS—SHEET 1.
INVENTOR:
AUSTIN R. DODGE A. R. DODGE.
METER FOR MEASURING THE FLOW OF FLUIDS.
APPLICATION FILED MAR. 10, 1909.
1,087,931.
Patented Feb. 24, 1914.
6 SHEETS—SHEET 2.
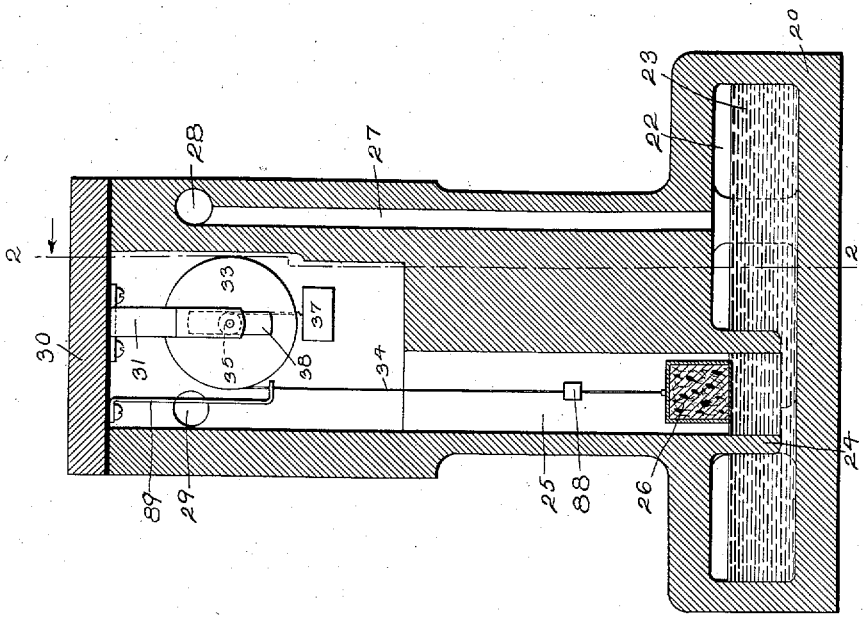
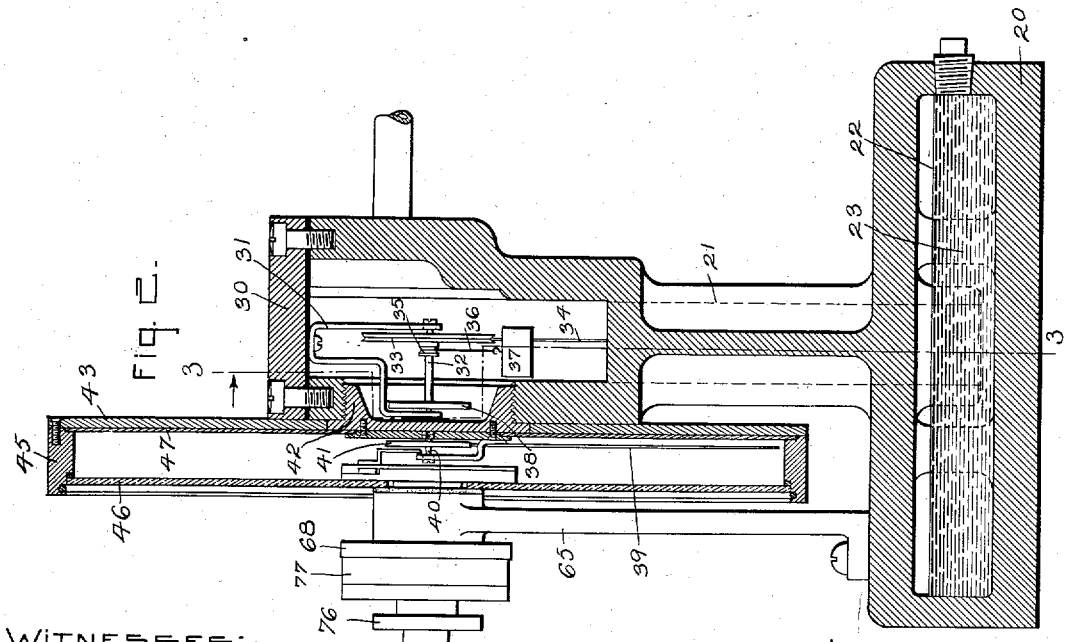
WITNESSES:
INVENTOR:
AUSTIN R. DODGE
BY
ATTY.

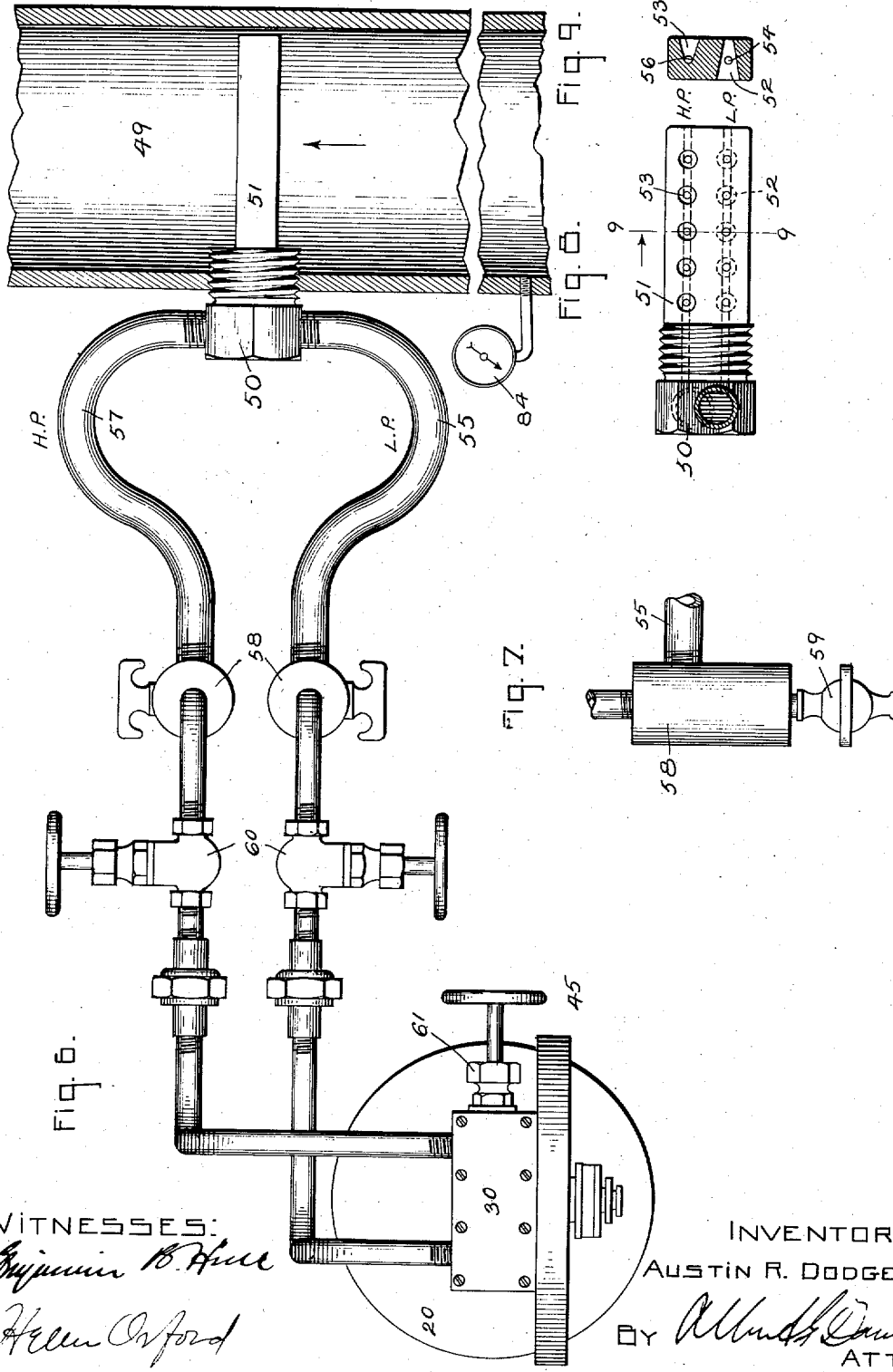

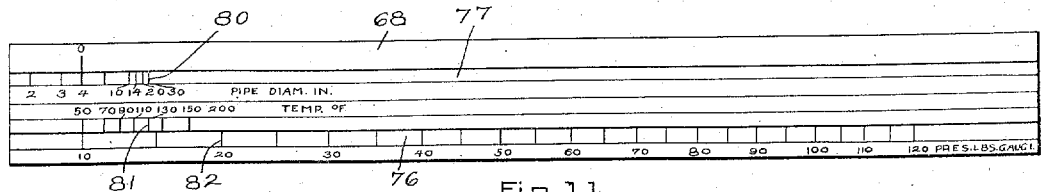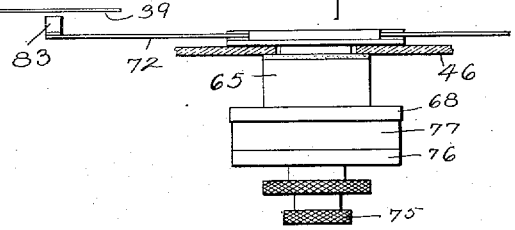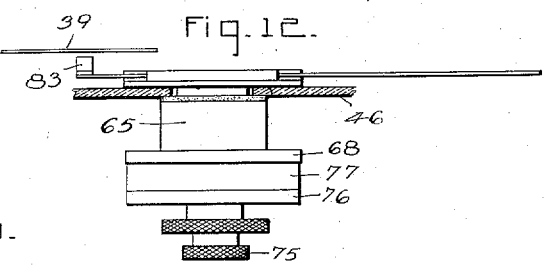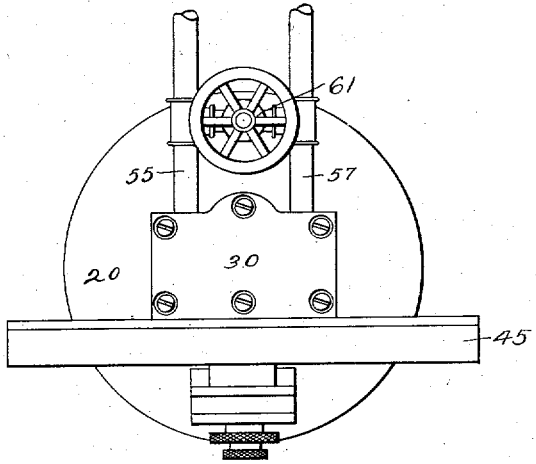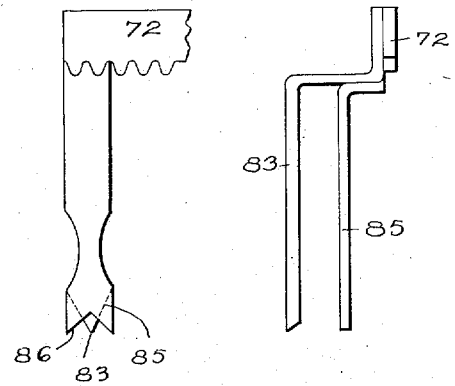

A. R. DODGE.
METER FOR MEASURING THE FLOW OF FLUIDS.
APPLICATION FILED MAR. 10, 1909.

1,087,931.

Patented Feb. 24, 1914.

6 SHEETS—SHEET 6.

WITNESSES:

INVENTOR:
AUSTIN R. DODGE

BY
ATTY.

UNITED STATES PATENT OFFICE.

AUSTIN R. DODGE, OF SCHENECTADY, NEW YORK, ASSIGNOR TO GENERAL ELECTRIC COMPANY, A CORPORATION OF NEW YORK.

METER FOR MEASURING THE FLOW OF FLUIDS.

1,087,931.  Specification of Letters Patent.  Patented Feb. 24, 1914.

Application filed March 10, 1909. Serial No. 482,457.

*To all whom it may concern:*

Be it known that I, AUSTIN R. DODGE, a citizen of the United States, residing at Schenectady, county of Schenectady, State of New York, have invented certain new and useful Improvements in Meters for Measuring the Flow of Fluids, of which the following is a specification.

The present invention has for its object to provide a simple, reliable and accurate meter for indicating the flow of fluid through a conduit.

In the following description and the claims appended thereto will be set forth what I believe to be novel and my invention.

Figure 18:
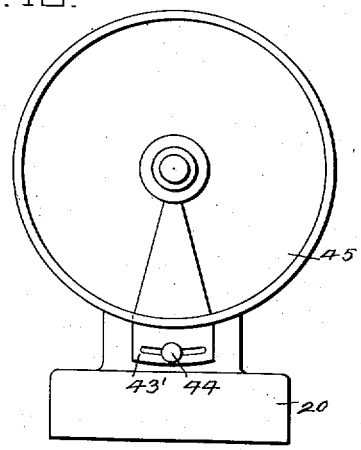
Figure 19:
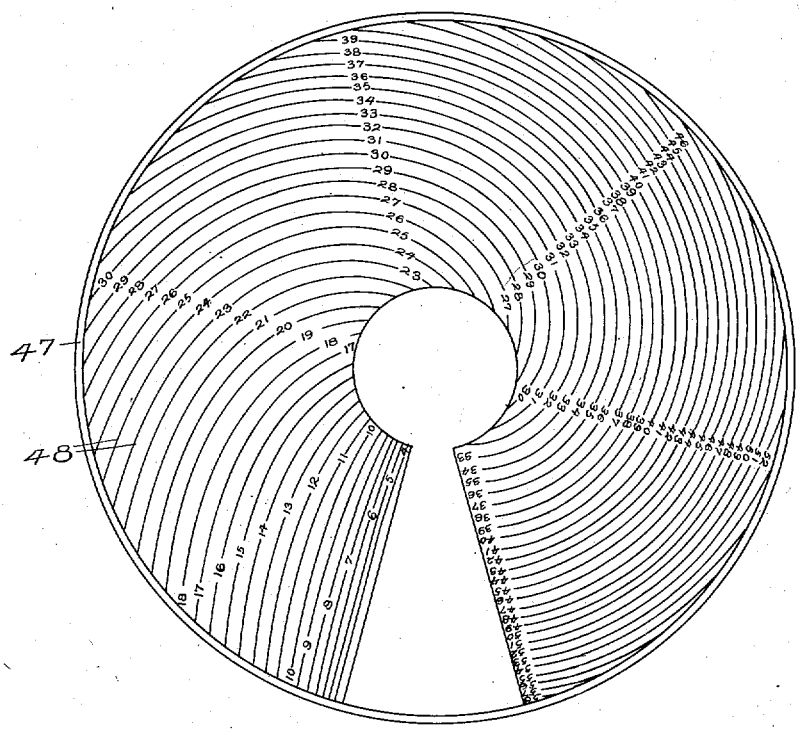

In the accompanying drawings which are illustrative of certain embodiments of my invention, Figure 1 is a front view of a meter calibrated to read in cubic feet of free air per square inch per minute; Fig. 2 is a section taken on line 2—2 of Fig. 3; Fig. 3 is a section taken on line 3—3 of Fig. 2; Fig. 4 is a detail sectional view of the means for correcting for changes in pressure, temperature and pipe diameter; Fig. 5 is a detail sectional view of the means for moving the compensating pointer; Fig. 6 is a detail view showing the meter connected to a fluid carrying main or conduit; Fig. 7 is a drip chamber used when the meter is used to meter air; Fig. 8 is a side elevation of the agent, nozzles or funnels that are located in the main and are acted upon by the fluid passing there through; Fig. 9 is a sectional view of a nozzle taken on line 9—9 of Fig. 8; Fig. 10 is a developed view of the scales for adjusting for changes in pressure, pipe diameter and temperature; Fig. 11 is a detail view showing the pointer in one of its positions; Fig. 12 is a similar view showing the pointer moved to a position nearer the axis of the meter; Fig. 13 is a detail view in plan showing a slight modification of the valve arrangement for cutting the meter into and out of action; Figs. 14 and 15 are detail views of the pointer; Fig. 16 is a detail sectional view taken on line 16 of Fig. 17 and showing the means for moving the pointer mounted directly on the glass front of the meter, Fig. 17 is a sectional view of the same meter taken on line 17 of Fig. 16; Fig. 18 is a detail view showing a means for adjusting the meter to correct for the zero position, and Fig. 19 is a view of a scale calibrated in flow lines for low pressure service.

My invention is based upon the principle that the velocity of water, steam or air flowing through a pipe at any fixed pressure varies directly with changes in the amount of such fluid in a given unit of time. From this it follows that the measurement of the velocity of flow of a fluid affords an accurate means for determining the quantity of fluid flowing at any given instant.

To enable one to understand and appreciate the character and construction of the meter and for the purpose of illustration, reference is hereinafter made to a meter for measuring elastic fluids of which a brief description will first be given.

A column of fluid such as water, mercury or other fluid heavier than that to be metered, is so arranged in a hermetically sealed vessel containing one or more chambers that as the quantity of elastic fluid flowing through a given pipe changes, one end of the column is moved or deflected in one direction and the other end in the opposite direction. This action is brought about by nozzles located in the pipe or main to be metered, or by equivalent devices, said nozzles or devices communicating with the chamber or chambers containing the column of heavy fluid. One end or portion of one nozzle faces the direction of the approaching steam or air to be metered and acts by pressure on the column of heavy fluid in the meter to cause a deflection or change in level. The pressure due to this nozzle is equal to the static pressure of the fluid being metered plus that due to the velocity head. The other nozzle faces in the opposite direction and the pressure due to it is less than the static pressure by an amount dependent upon the velocity of flow. The pressure due to one nozzle acts on one end of the column of heavy fluid in the meter and that due to the other nozzle on the opposite end of said column. The means for showing the amount of elastic fluid being metered is actuated by one end of said column. Resting on the end of the column is a float which actuates said means through suitable mechanism, as for example by a flexible connector connected to a drum that is counterweighted. The drum spindle carries a permanent bar magnet which acts magnetically through a wall of the closed chamber to move the needle of the instrument over a scale, the latter being laid out in flow lines according to careful calibration of cubic feet of free air per minute for air or in pounds per hour for steam. Combined with this is a pointer whose position is adjusted by hand to compensate for changes in temperature, pressure and pipe diameter. Indications are obtained by noting the point of intersection of the pointer and needle with respect to the flow lines on the dial. By arranging the parts as described the meter is not affected by barometric changes which is a decided advantage.

20 indicates the base of the vessel which is cast in one piece and has a chambered upright portion 21, Fig. 2, rising therefrom. These parts may be made of any suitable material that is not injured by the mercury or other fluid employed to actuate the needle. The base of the vessel is enlarged, and formed therein is a reservoir or chamber 22 containing a body of mercury 23. The lower end of the upright 21 is extended well below the working level of the mercury as shown at 24, Fig. 3, and the cross-sectional area of the chamber 25 in the upright is considerably less than the cross-sectional area of the chamber in the base of the meter so that a small deflection or movement of the mercury in the main chamber 22 will cause a large deflection or movement of the mercury in the lower end of the chamber 25, the object of this being to impart a relatively large movement to the float 26 that rests on the end of the column of mercury in the chamber 25. The float may be made in a variety of ways. As shown it comprises a central body of cork and a sealed inclosing metal envelop. The pressure for deflecting or moving the column or body of fluid in the chamber 22 is transmitted through the passage 27 which for convenience is formed in the part 21. Pressure is transmitted to this passage through the port 28. The chamber 25 is provided with a port 29 at its upper end, and the ports 28 and 29 are connected by small pipes to the nozzle or agent in the main that is to be metered.

The upper end of the upright 21 is finished, and secured thereto is a cover 30 that prevents the escape of fluid under pressure from the restricted chamber 25. The upper end of the chamber 25 is somewhat enlarged to receive the actuating mechanism of the meter. This mechanism comprises a bracket 31 that supports the spindle 32 and attached parts as a unit which may be secured to and removed with the cover 30. Mounted on the spindle is a large wheel or drum 33 containing a V-shaped groove to receive the flexible connector 34. One end of this connector is attached to the float 26 and the other end is attached to the drum. This connector may be made in a variety of ways and of different materials. It may be made of silk, cotton or fine chain, the principal requirement being that it shall be extremely flexible and thus offer a minimum opposition to bending as the drum is rotated. Mounted on the spindle 32 that carries the main drum is a small or auxiliary drum 35 to receive the connector 36 that supports the counterbalance 37. This counter-balance is so arranged that it compensates to a greater or less extent for the weight of the float.

Mounted on the spindle 32 is a permanent bar magnet 38 of suitable shape and size by means of which the angular movements of the drum are conveyed to the needle 39 of the instrument. It is to be noted that the magnet is located wholly within the part 21 and that there is no mechanical connection between it and the indicating needle of the instrument which would require packing. By reason of this arrangement the meter is rendered exceedingly accurate and sensitive to pressure changes. The needle is provided with a pivot 40, which is in axial alinement with the spindle 32 of the drum and is supported by bearings at its ends. The needle may be made of steel or other magnetic material so that it will follow the movements of the magnet, or as shown a bar magnet 41 is rigidly mounted on the spindle for moving the needle. In this case the needle is made of aluminum, the needle and magnet being welded or otherwise united. The lines of force from the bar magnet 38 pass through the non-magnetic wall of the chamber and act on the bar magnet 41 to move it angularly.

The vessel and its attached upright portion may be made of non-magnetic material, or it may be made of magnetic material in which case a non-magnetic plug 42 of suitable size to eliminate the effects of the metal of the vessel is screw threaded or otherwise mounted in an opening in said vessel. When so mounted the plug forms a part of the vessel wall. The said plug is provided with a finished annular flange that forms a support for the needle casing and about which it may be turned angularly to adjust the "zero" of the instrument, or in other words to cause the zero on the scale to register with the needle when the flow of fluid to be metered ceases or the meter is cut off from main or conduit. On the left-hand side of the upright 21, Fig. 2, is mounted a non-magnetic plate 43 forming the back of the needle containing casing. This disk is rotatably mounted on the plug 42. The lower side of the disk 43 is provided with a slotted extension 43', Fig. 18, and in the slot is located the thumb-screw 44. By loosening the screw the disk and parts carried thereby can be moved angularly in one direction or the other from the position shown until the zero of the scale corresponds with the position of the needle 39. It is to be understood of course that at such time the pressure is cut off from the fluid column. After this adjustment is made the thumb-screw 44 is screwed into place to clamp the disk and casing in position.

Attached to the disk is a ring 45 that forms a part of the casing. Arranged over the moving needle and carried by this ring is a glass front 46 through which the position of the needle can be observed. The casing thus formed is made as tight as possible to prevent the entrance of foreign matter. Mounted on the disk 43 is a dial 47 having curved flow lines 48 thereon, Fig. 1, which are obtained by calibration from a suitable standard or standards.

Mounted on a support in front of the meter is a manually actuated means for moving a pointer located within the casing to compensate for changes in the temperature and pressure of the fluid being metered and also for changes in pipe diameter, which latter compensation is necessary when the meter is removed from a main of one diameter and placed on another of different diameter. This feature will be described fully later on.

The means illustrated for creating the necessary pressure to operate the meter will now be described, reference being made especially to Figs. 6 to 9 inclusive.

49 indicates the main through which the fluid to be metered is flowing. The pressure producing agent, device or means can be made in a variety of ways and arranged in or as a part of the main so long as a pressure difference having a definite relation to the rate of flow is transmitted to the ends of the mercury column. In the present embodiment of my invention it comprises a plug 50 that is screw-threaded into a small hole formed in the main. This plug is provided with a hexagonal or other suitably shaped head to receive a wrench so that it can readily be inserted or removed. Integral with the plug is a rectangular part or portion 51 extending across the main and containing a plurality of conical-shaped nozzles or funnels arranged in sets 52 and 53. Those of set 52 have their large ends facing away from the direction in which the steam, gas or other fluid is flowing in the main, and may be termed "low pressure" nozzles and are marked L. P. on the drawing. Those of set 53 do not extend through the part 51 as do the nozzles 52, and are reversely arranged, that is to say they are cone-shaped with the large ends facing the direction from which the steam, gas or other fluid is received. For convenience these may be termed "high pressure" nozzles and are marked H. P. on the drawing. The low pressure nozzles or funnels are connected by the longitudinally extending passage 54 which communicates with the pipe 55 leading to the meter. The high pressure nozzles or funnels are connected by the passage 56 which communicates with the pipe 57 leading to the meter. The high pressure pipe is tapped into the port 28, Fig. 3, of the meter and the low pressure pipe is tapped into the port 29. As the fluid flows through the main a pressure is created in the nozzles 53 and a suction in the nozzles 52. These effects are communicated to the meter, the pressure tending to force the mercury or other heavy fluid from the chamber 22, Fig. 3, having the large area into the chamber 25 having the small area. If the areas of these chambers bear a ratio of ten to one then the upward movement of the float 26 will be ten times greater than the downward movement or deflection of the fluid level in the chamber 22. This action is assisted by the suction nozzles 52 which reduce the pressure in the float chamber 25 above the mecury therein. The pressure difference required to move the fluid column and float is relatively small but since the pressure existing in the meter is not materially less than that in the main the parts must be strong enough to withstand such pressure. By doing away with all moving parts that are exposed both to high and to low pressure, considering the pressure in the main and connecting pipes as "high" and that of the atmosphere as "low," I am able to dispense with all packings for the moving elements which are always a great objection and which in addition usually if not always affect the accuracy of the meter. The nozzle plug illustrated is not claimed herein because it forms part of the subject matter of a co-pending application of mine, Serial No. 421,696.

In each of the pipes leading to the meter, when the latter is used for air, is placed a chambered casing 58, Fig. 7, to trap water, and leading therefrom is an outlet containing a shut-off valve 59. I may also place in these pipes hand valves 60 for shutting off the meter when desired. In the meter or in some other position suitable for equalizing the pressures in the pipes 55 and 57 is a valve 61, Figs. 6 and 17. When this valve is closed the meter is in condition for operation, but when open the pressures in the chambers 22 and 25 are equalized through the port 62, Fig. 17, and hence there can be no transfer or deflection of the mercury from one chamber to another. Instead of using a valve for this purpose which is located in the meter itself, the valve may be placed in a by-pass or shunt connecting the pipes 55—57, as shown in Fig. 13.

With meters of this type it is necessary, if the very best results are to be obtained, to take into consideration the pressure of the fluid to be metered and also its temperature. It is also necessary to take into consideration the diameter of the main. If the meter was intended for use only on mains of the same predetermined diameter for measuring fluid of constant temperature and pressure it could be calibrated in connection with one such main and manual adjustment or compensation for mains of different sizes and for variations in the physical condition of the fluid would be unnecessary. Obviously the adjusting mechanism could then be omitted if desired. I intend, however, to also use the meter on mains differing largely in diameter and for service where the pressure and temperature also change.

From the results of exhaustive tests and calculations I have ascertained that the effects of changes in temperature and pipe diameter can be expressed in terms of pressure. Hence accurate readings may be obtained by providing a pointer whose position can be adjusted to compensate for such changes and also to compensate for changes in pressure in the main, this pointer being in addition to the needle 39 whose angular position automatically changes with changes in the rate of flow per unit of time of the fluid passing through the main. The indications of the meter briefly stated are obtained in the following manner: The needle 39 is moved in response to changes in the rate of flow of the fluid being metered, and the compensating devices and pointer are then moved by hand until some predetermined part of the latter is directly over the needle. Then by comparing the positions of the needle and pointer with the curved flow lines on the fixed scale the amount of fluid flowing in the main can be ascertained, either directly if the meter is so calibrated or by multiplying said reading by a constant.

The devices, means or mechanism for compensating for the above noted variables will now be described. Mounted in a support 65 in front of the needle casing, Fig. 4, is a tubular member 66 whose axis coincides with that of the pivot 40 of the needle 39 and also with the axis of the spindle 32 of the drums, Fig. 2. This member passes through a circular orifice in the glass and is provided with a flange 67 that rests against the inner face thereof. On the outside of the casing and mounted on said member is a collar 68. Between the bearing or support 65 and the glass is a relatively soft gasket or washer 69 to prevent the entrance of foreign matter into the needle casing. On the peripheral face of the collar is made one or more datum points, marks or other indications from which the other parts are set as will appear later in connection with Fig. 10. Extending axially through the member 66 is a spindle 70 whose axis is in alinement with that of the pivot of the needle 39. On one end of this spindle is a gear wheel 71 whose teeth mesh with those in a rack 72 which is directly connected to and moves the pointer. The rack is held in position and guided by a flat plate 73 which is attached to the flange 67 of member 66 and whose upper end is provided with a guide that engages the top of the rack 72. On the spindle and engaging the member 66 is a hub or collar 74 which assists in clamping the parts together as will appear later. The outer end of the spindle is screw-threaded to receive the clamping nut 75. Mounted on the spindle between the nut and the member 66 is a disk 76 that is splined on the spindle and has a certain limited amount of motion axially thereon when the nut is released. On this disk is a scale laid off in terms of pressure as will appear later in connection with Fig. 10. Between the disk and collar 68 is a ring 77 that is carried by the member 66. The ring is provided with a recess 78, Fig. 5, in which is located a curved spring 79. The ends of the spring rest on the bottom of the recess and the arch or curved part on the member 66. The arrangement thus forms a friction device to prevent the parts from turning too freely with respect to each other. On the ring 77 are two scales laid off in terms of temperature and pipe diameter as will appear in connection with Fig. 10. When the nut 75 is seated, the disk 76, ring 77, collar 68, member 66, rack 72 and pointer may be rotated as a unit. Since the collar 74 engages the member 66 and the disk 76 is in engagement with the end of the member, the clamping action of the nut 75 does not tend to pinch the glass between parts of the rotatable structure and hence the necessary freedom of action is provided for.

Fig. 10 is an enlarged developed view of the scales on the parts above referred to. 68 indicates the collar that is fast on the rotatable member 66. At a suitable place thereon a mark or datum point is made which is lettered O. On the ring 77 there are two scales 80 and 81, the former being graduated or laid off in terms of pipe diameter and the latter in terms of temperature in degrees Fahrenheit. On the disk 76 is a scale 82 graduated in terms of pressure. It is evident by adjusting these scales angularly one with respect to the other that the position of the pointer 83 on the rack 72 will be changed because any angular movement of the scale 82 necessitates a corresponding movement of the spindle 70, gear 71 and rack 72.

Assume for example that the meter is connected to a four inch main conveying air at 10 lbs. pressure, as determined by the gage 84, Fig. 6, and having a temperature of 50° F., as determined by a thermometer, the figure 4 on scale 80, Fig. 10, is set opposite 0 on the collar 68. The figure 10 on scale 82 of the pressure disk 76 is set opposite 50° F. on the temperature scale 81 on the ring 77. The nut 75 is then screwed into place to clamp the parts together after which the moving structure as a whole is moved angularly by means of the disk 76 until the position of the pointer 83 coincides with that of the needle 39 as shown in Fig. 12. For relation of the parts see also dotted line position of the needle in Fig. 1.

When the meter is used for measuring air the flow lines 48 on the dial are calibrated to indicate the number of cubic feet of free air at 70° F. which pass through one square inch of pipe area. Assume that under the conditions above specified the positions of the needle and pointer register over the flow line indicating 26½ cubic feet of free air per square inch. This indication is then multiplied by the cross-sectional area of the four inch main, in this case 12.5664 square inches which equals 333 + cubic feet of free air per minute passing through the main. Assume that the meter is now shifted to a ten inch main, the pressure and temperature of the air to be metered being the same as before, i. e., 10 lbs. pressure and 50° F. Assume also that the needle is in the same position as before. The pointer will be moved a distance from its axis determined by the change in pipe diameter. The positions of the needle and pointer will register over the flow line indicating 29 cubic feet of free air per minute. This indication is then multiplied by the cross-sectional area of the ten inch main, in this case 78.54 square inches which equals 2277.66 cubic feet of free air per minute passing through the main.

The figures above noted will give a good idea of the conditions as determined by changes in pipe diameter and the difference in flow of the fluid for a given deflection or angular movement of the needle.

Assume that by a thermometer suitably placed it is ascertained that the temperature of the air instead of being 50° F, as in the last case is 90° F. The line marked 10 on the pressure scale 82 of disk 76 is moved to the right until said line registers with the line marked 90 of the temperature scale 81 on the ring 77. The effect of this is to move the pointer inward toward its axis by a certain amount and hence the reading of the instrument will be slightly lower.

The temperature scale is calibrated for air. When the meter is used for steam the scale 81 will be calibrated in terms of superheat. As the appearance would be much the same further illustration is deemed unnecessary.

Assuming now a ten inch main, a pressure of 80 lbs. and a temperature of 50° F. The figure 10 on scale 80 is set opposite 0 on the collar 68. The figure 80 on the scale 82 of the pressure disk or dial 76 is set opposite 50° F. on the temperature scale 81 on the ring 77. The nut 75 is first screwed into place to clamp the parts together and then the structure is moved angularly until the position of the pointer coincides with that of the needle 39 as shown in Fig. 11. The difference in position of the pointer under these conditions is readily apparent by comparing Figs. 11 and 12. Under different conditions of operation, the relation of the parts will obviously be changed.

I have assumed the various above stated conditions for the purpose of illustration, and not as limitations. From the examples given it is believed that the nature and character of the adjustments required will be readily understood without further description.

When the meter is intended for metering steam mains the flow lines 48 are calibrated to indicate pounds of steam per hour passing through one square inch of pipe or main area. The indication obtained by comparing the registering positions of the needle and pointer with a flow line directly in line with said position is then multiplied by the cross-sectional area of the pipe or main to give the total flow of steam in pounds per hour. The general appearance of the flow lines for metering steam is much the same as those illustrated and further illustration is deemed unnecessary.

In a meter of this type employing a needle that is moved automatically by the fluid column and a manually adjusted pointer to give the indications, it may be a little difficult for unskilled persons to locate the exact point on the scale which registers with the point of intersection of the needle and pointer. To overcome this the pointer 83 is offset as shown in Fig. 15 so as to bring it close to the path of the needle. Located directly in front of the pointer but separated therefrom is a piece 85 containing a V-shaped notch 86. By sighting from one to the other when the pointer is over the needle (an action similar to sighting a gun) the point of coincidence of the needle, pointer and flow line can be readily and accurately determined. This arrangement also requires the operator to make the reading when directly facing the scale which is an advantage.

In Fig. 1 the dial is calibrated with flow lines 48 and is intended for high pressure service. In Fig. 19 the dial is also calibrated with flow lines and is intended for low pressure service. I have found it best to use different dials in meters intended for widely different pressures since by so doing more accurate results can be obtained than in using the same dial for all conditions. Where the range is very great the flow lines in the latter instance are rather apt to be too crowded in certain parts.

In Figs. 16 and 17 is shown a slight modification of my invention wherein the support 65 for the parts which move the pointer is dispensed with and said parts are supported directly by the glass front 46 of the needle casing as is apparent from inspection. The general construction and arrangement of the parts aside from the support is the same as described in connection with Figs. 4 and 5. The needle casing is swiveled about the non-magnetic and screw-threaded plug 42, and is held in position against angular movement by the slotted extension 43′ and screw 44, Fig. 18. In Fig. 17 the equalizing valve 61 is shown as carried by the vessel containing the operating parts of the meter instead of being located in a by-pass connecting the pipes 55 and 57 as in Fig. 13. In some instances this is an advantage as it simplifies the piping. In some cases I have found it desirable to use an auxiliary weight 88, Fig. 17, to mount it on the flexible connector 34 to prevent the latter from getting out of the groove in the drum 33. The counterweight 37 is or may be made correspondingly heavier to compensate for this auxiliary weight. As an additional precaution to prevent the connector from getting out of the groove in the drum a guide 89 is provided, Fig. 3, that is secured to the cover 30 and is removable therewith.

It is to be understood that while I consider the agent described in connection with Figs. 6, 8 and 9 as being extremely desirable for the purpose set forth, owing to its effective action, I do not limit myself thereto since other means may be employed for the purpose, nor do I limit myself to the particular means illustrated for showing the quantity of flow except as specified in the claims.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a meter, the combination of an agent for creating a pressure difference responsive to the rate of flow of the fluid being metered, a vessel containing a body of fluid that is acted upon by said pressure difference, conduit means for conveying fluid under pressure between the agent and the vessel, a drum, a float, a connector between the drum and float for imparting motion from one to the other, the float being moved by the body of fluid, a counterbalance for the float, a needle located outside of the vessel, a dial over which the needle moves, a magnetic device acting through the wall of the vessel for transmitting movements of said means to the needle, and means whereby the magnetic device is moved by the drum.

2. In a meter, the combination of an agent for creating a pressure difference that bears a definite relation to the rate of flow of the fluid being metered, a sealed vessel having chambers of dissimilar size containing a body of fluid that is acted upon by said pressure difference, the fluid column in the smaller chamber having a greater movement than that in the larger, conduit means conveying fluid under pressure between the agent and the chambers, a float in the smaller chamber whose position is determined by the deflection of said fluid body, an indicator located wholly outside of the vessel, a magnetic means for transmitting movements of the float to the indicator, and means connecting one portion of the magnetic means and the float.

3. In a meter, the combination of an agent for creating a pressure difference that bears a definite relation to the rate of flow of the fluid being metered, a sealed vessel having chambers of unequal size containing a body of heavy fluid that is deflected by changes in said pressure difference, conduit means connecting the agent and the chambers, a means located in the smaller chamber whose position changes with deflections of said heavy fluid, a counterbalance for the last named means, indicating mechanism, and a magnetic agent for transmitting movements of the means to the mechanism.

4. In a meter, the combination of an agent for creating a pressure difference that bears a definite relation to the rate of flow of the fluid being metered, a vessel having a removable non-magnetic side wall and containing a column of fluid which is deflected as the pressure difference changes, conduit means connecting the agent and the vessel, a float that is supported by one end of the fluid column, an indicating mechanism comprising a dial and a needle, a means arranged above said end and acting magnetically through said side wall to transmit the movements of the float to the needle, a bracket for supporting said means that is mounted on the inside of the vessel, and a connection between the float and the means.

5. In a meter, the combination of an agent for creating a pressure difference that bears a definite relation to the rate of flow of the fluid being metered, a vessel having a large and a small chamber and containing a column of fluid larger at one end than the other which column is deflected as the pressure difference due to the agent changes, conduit means connecting the agent and the chambers, an indicating mechanism, and magnetic means located in the small chamber and acting to transmit the movements of the small end of the fluid column to the indicating mechanism.

6. In a meter, the combination of an agent for creating a pressure difference that bears a definite relation to the rate of flow of the fluid being metered, a sealed chambered vessel containing a body of heavy fluid that is deflected by changes in said pressure difference due to the agent, conduit means connecting the agent with the chamber of the vessel, an indicator located outside of the vessel, a dial over which the indicator moves, means for mounting the dial on the vessel so as to permit angular adjustment of said dial, a means moved by the said body of fluid and located within the vessel, and a magnetic device acting through a wall of the vessel to transmit movements of said means to the indicator.

7. In a meter, the combination of an agent for creating a pressure difference that bears a definite relation to the rate of flow of the fluid being metered, a vessel having chambers of dissimilar size both containing a body of heavy fluid that is deflected by changes in the said pressure difference from one chamber to another, conduit means connecting the agent with the chambered vessel, a means in one of the chambers whose position changes with deflections of said heavy fluid, a counterbalance therefor, and indicating mechanism that moves responsive to changes in position of said means.

8. In a meter, the combination of an agent for creating a pressure difference that bears a definite relation to the rate of flow of the fluid being metered, a vessel provided with a reservoir of relatively large area and having a restricted chamber leading therefrom, both containing a body of fluid that is deflected by the said pressure difference, conduit means connecting the agent with the reservoir and chamber of the vessel, a float riding on the fluid and located in the chamber, a magnetic means, a flexible connector connecting the float and the magnetic means, an indicator located outside of the vessel and moved by said means, and a cover for the vessel which supports a part of the magnetic means and is removable with it.

9. In a meter, the combination of an agent for creating a pressure difference that bears a definite relation to the rate of flow of the fluid being metered, a sealed vessel having communicating chambers which contain a fluid, a conduit transmitting high pressure from one part of the agent to one chamber, a conduit transmitting low pressure from another part of the agent to the other chamber, a float located wholly in one of the chambers and riding on the body of fluid therein, a motion transmitting device moved by the float, indicating mechanism moved magnetically by the said device, an angularly adjustable dial, and means for holding the dial in its adjusted position.

10. In a meter, the combination of an agent for creating a pressure difference that bears a definite relation to the rate of flow of the fluid being metered, a vessel having a chamber, one portion of which is larger than the other, said chamber containing a fluid column that is larger at one end than at the other and is deflected by changes in the said pressure difference, conduit means conveying fluid pressure from the agent to different portions of said chamber, a float that rides on the small end of the fluid column, a wheel, a connecting means for transmitting movements of the float to the wheel, a magnet, a shaft conveying motion from the wheel to the magnet, a needle, a dial, and a mass of magnetic material secured to the needle and coöperating with the magnet to move the needle with respect to the dial.

11. In a meter, the combination of an agent for creating a pressure difference that bears a definite relation to the rate of flow of the fluid being metered, a sealed vessel containing a column of fluid that is deflected by changes in the pressure difference due to the agent, conduit means between the agent and the interior of said vessel, a float that rides on the fluid column, a winding drum, a flexible connector between the float and drum, a counterbalance moving with the drum and acting to keep the connector taut, indicating mechanism located outside of the casing comprising a needle and a dial, a means for transmitting movements of the drum to the indicating mechanism, and a pointer that coöperates with the needle and dial to indicate the rate of flow of the fluid being metered.

12. In a meter, the combination of an agent for creating a pressure difference that bears a definite relation to the rate of flow of the fluid being metered, a vessel having walls that form an enlarged chamber in its base and a chamber of relatively restricted size extending upward from the base, the walls of the second chamber projecting into the enlarged chamber, and both chambers containing fluid, conduit means connecting the agent and said chambers, a means located in the said restricted chamber and movable in response to deflections of the fluid therein, a magnetically actuated needle, a device that transmits motion from the means to the needle, and a dial over which the needle moves that is suitably calibrated.

13. In a meter, the combination of an agent for creating a pressure difference that bears a definite relation to the rate of flow of the fluid to be metered, a chambered vessel containing fluid that is deflected by the pressure difference caused by the agent, conduit means connecting the agent and chambered vessel, a cover for sealing the chamber in the vessel, a means movable in response to deflections of the fluid in the vessel, a drum, a spindle therefor, a means for supporting the drum and spindle from the cover, a connector between the first named means and the drum, a magnet mounted on the spindle and inside of the vessel, a needle located outside of the vessel, a magnet also located outside of the vessel and connected to the needle for moving it, the inside magnet acting inductively on the outside magnet, and a dial for the needle.

14. In a meter, the combination of an agent for creating a pressure difference that bears a definite relation to the rate of flow of the fluid to be metered, a chambered vessel containing fluid that is deflected by the pressure difference caused by the agent, conduit means connecting the agent and the chambered vessel, a cover for closing the chamber in the vessel, a needle, a means movable in response to deflections of the fluid in the chamber, and mechanism connected to the means and located wholly within the vessel for supplying the force necessary to move the needle, the said means and mechanism being entirely carried by and removable with the cover.

15. In a meter, the combination of an agent for creating a pressure difference that varies with and bears a definite relation to the rate of flow of the fluid to be metered, a vessel containing a body of fluid that is deflected by the pressure difference due to the agent, conduit means connecting the agent and the vessel, an indicating means that includes a needle for indicating the deflections, a means for transmitting the movements of the fluid body to the indicating means, a dial, and a pointer, the needle and pointer coöperating with the dial to give the indications on the meter.

16. In a meter, the combination of an agent for creating a pressure difference that varies with and bears a definite relation to the rate of flow of the fluid to be metered, a vessel containing a body of fluid that is deflected by the pressure difference due to the agent, conduit means connecting the agent with the vessel, an indicating means that includes a needle for indicating the deflections, a means for transmitting the movements of the fluid body to the indicating means, a graduated dial, a pointer, the intersection of the needle and pointer with respect to the graduations on the dial giving the indications of the meter, and a means for moving the pointer.

17. In a meter, the combination of an agent for creating a pressure difference that varies with and bears a definite relation to the rate of flow of the fluid to be metered, a fluid containing vessel, conduit means connecting the agent and the vessel, means whose position changes as the fluid in the vessel moves under the influence of variations in the pressure difference created by the agent, a needle moved by the means, and an adjustable pointer which coöperates with the needle to indicate the rate of flow of the fluid being metered.

18. In a meter, the combination of an agent for creating a pressure difference that varies with and bears a definite relation to the rate of flow of the fluid to be metered, a fluid containing vessel, conduit means connecting the agent and the vessel, means whose position changes as the fluid in the vessel moves under the influence of variations in the pressure difference created by the agent, a needle moved by the means, a dial, a pointer that coöperates with the needle to indicate the rate of flow of the fluid being metered, and manually actuated means for moving the pointer.

19. In a meter, the combination of an agent for creating a pressure difference that varies with and bears a definite relation to the rate of flow of the fluid to be metered, a fluid containing vessel, conduit means connecting the agent and the vessel, means whose position changes as the fluid in the vessel moves under the influence of variations in pressure created by the agent, a needle moved by the means, a dial, a pivotally supported pointer that coöperates with the needle to indicate the rate of flow of the fluid being metered, and means for moving the pointer angularly with respect to the dial.

20. In a meter, the combination of an agent for creating a pressure difference that varies with and bears a definite relation to the rate of flow of the fluid to be metered, a fluid containing vessel, conduit means connecting the agent and the vessel, means whose position changes as the fluid in the vessel moves under the influence of variations in the pressure difference created by the agent, a needle moved by the means, a graduted dial, a pivotally supported pointer that coöperates with the needle to indicate the rate of flow of the fluid being metered, and means for moving the pointer toward and away from the axis of its support.

21. In a meter, the combination of an agent for creating a pressure difference that varies with and bears a definite relation to the rate of flow of the fluid to be metered, a fluid containing vessel, conduit means connecting the agent and the vessel, means whose position changes as the fluid in the vessel moves under the influence of variations in the pressure difference created by the agent, a needle moved by the means, a graduated dial, a pivotally supported pointer that coöperates with the needle to indicate the rate of flow of the fluid being metered, and means for moving the pointer angularly with respect to the dial and toward and away from the axis of its support.

22. In a meter, the combination of an agent for creating a pressure difference that varies with and bears a definite relation to the rate of flow of the fluid to be metered, a fluid containing vessel, conduit means connecting the agent and the vessel, means whose position changes as the fluid in the vessel moves under the influence of variations in the pressure difference created by the agent, a needle moved by the means, a graduated dial, a pointer that coöperates with the needle to indicate the rate of flow of the fluid being metered, a means for moving the pointer, and a scale calibrated in terms of pressure to determine the amount of movement to be imparted to the pointer.

23. In a meter, the combination of an agent for creating a pressure difference that varies with and bears a definite relation to the rate of flow of the fluid to be metered, a fluid containing vessel, conduit means connecting the agent and the vessel, means whose position changes as the fluid in the vessel moves under the influence of variations in the pressure difference created by the agent, a needle moved by the means, a graduated dial, a pointer that coöperates with the needle to indicate the rate of flow of the fluid being metered, a means for moving the pointer, and a scale calibrated in terms of temperature to determine the amount of movement to be imparted to the pointer.

24. In a meter, the combination of an agent for creating a pressure difference that varies with and bears a definite relation to the rate of flow of the fluid to be metered, a fluid containing vessel, conduit means connecting the agent and the vessel, means whose position changes as the fluid in the vessel moves under the influence of variations in the pressure difference created by the agent, a needle moved by the means, a graduated dial, a pointer that coöperates with the needle to indicate the rate of flow of the fluid being metered, means for moving the pointer, and a scale calibrated in terms of pipe diameter to determine the amount of movement to be imparted to the pointer.

25. In a meter, the combination of an agent for creating a pressure difference that varies with and bears a definite relation to the rate of flow of the fluid to be metered, a vessel, conduit means connecting the agent and the vessel, means associated with the vessel whose position changes with variations in the pressure difference created by the agent, a needle moved by the means, a graduated dial, a pointer that coöperates with the needle to indicate the rate of flow of the fluid being metered, means for moving the pointer, concentric and angularly movable scales, means connecting one of the scales to the pointer for adjusting its end longitudinally toward and away from its axis of motion, and means for clamping the scales and pointer and moving them angularly about the axis of the needle.

26. In a meter, the combination of a chambered vessel having a base and an upright portion carried by the base, a magnet within said portion of the vessel, a spindle therefor, a means for oscillating the spindle, a magnet located outside of the vessel and moved by the first magnet, a pivot therefor whose axis is in alinement with that of the spindle, a nonmagnetic plug in the wall of the vessel that is arranged between the two magnets and supports the pivot, a needle moved by the second magnet, a suitably calibrated dial, and means for mounting the dial on the plug in such a manner that it can be moved angularly.

27. In a meter, the combination of a pointer, a rack and gear for moving the pointer longitudinally, a tubular member, a support having a bearing in which the member is rotatably mounted, a spindle that extends through the member and is connected to the gear for moving it and the pointer, a collar mounted on the member, a ring also mounted thereon, a disk splined on the spindle, and means for clamping the parts together to permit of angular movement about the axis of said bearing.

28. In a meter, the combination of a chambered vessel containing a body of heavy fluid, a float which rides thereon, a drum, a flexible connector that is secured to the float and passes over the drum, a weight on the connector between the float and the drum to keep it taut a needle, a means actuated by the drum for moving the needle, and a guide for keeping the connector on the drum.

29. In a meter, the combination of an agent a chambered vessel containing a body of heavy fluid, conduit means connecting the agent and the vessel, a float which rides on said body of fluid, a drum, a flexible connector that is secured to the float and passes over the drum, a needle, a means actuated by the drum for moving the needle, and a weight suspended by the connector between the float and the drum for holding it taut.

30. In a fluid meter, the combination of an agent a hermetically sealed vessel, conduit means establishing communication between the agent and the interior of the vessel, a means located wholly within the vessel that is movable in response to changes in the rate of flow of the fluid being metered, a needle and its pivot located wholly outside of the vessel, a dial, a magnetic device acting through a wall of the vessel for transmitting the movements of said means to the needle, and a movable element also outside of the vessel which coöperates with the needle to give the indications of the meter.

31. In a fluid meter, the combination of an agent a hermetically sealed vessel, conduit means establishing communication between the agent and the interior of the vessel, a means located wholly within the vessel that is movable in response to changes in the rate of flow of the fluid being metered, a needle and its pivot located wholly outside of the vessel, a dial, a magnetic device acting through a wall of the vessel for transmitting the movements of said means to the needle, and a pointer which is movable toward and away from the axis of the needle and coöperates with the latter to give the indications of the meter.

32. In a fluid meter, the combination of an agent a hermetically sealed vessel, conduit means establishing communication between the agent and the interior of the vessel, a means located wholly within the vessel that is movable in response to changes in the rate of flow of the fluid being metered, a needle and its pivot located wholly outside of the vessel, a dial, a magnetic device acting through a wall of the vessel for transmitting the movements of said means to the needle, a pointer that coöperates with the needle to give the indications of the meter, and means for moving the pointer both angularly and radially.

33. In a fluid meter, the combination of an agent an actuating mechanism, means whereby the actuating mechanism moves in response to changes in the amount of fluid being metered as determined by the agent, an indicating needle moved thereby, a suitably graduated dial, and a pointer that is movable independently of the needle and which coöperates therewith to give the indications of the meter.

34. In a fluid meter, the combination of an agent an actuating mechanism, means whereby the actuating mechanism moves in response to changes in the amount of fluid being metered as determined by the agent, a pivoted needle moved thereby, a suitably graduated dial over which the needle moves, a pivoted pointer whose axis coincides with that of the needle, a means for moving the pointer angularly to cause it to register with the needle, and a means for moving the pointer radially along the plane of the needle.

35. In a fluid meter, the combination of a graduated dial, a needle movable with respect to the dial, and a movable pointer comprising two parts, one of which lies in a plane parallel to that of the needle and is in close proximity thereto while the other is spaced apart from the first and occupies the same relative angular position.

36. In a fluid meter, the combination of an actuating mechanism, a vessel containing said mechanism, an indicating device moved thereby, a graduated dial, a second indicating device, the two devices coöperating with the dial to give the indications of the meter, and a casing for the devices that carries the dial and which is angularly adjustable on the vessel.

37. In a fluid meter, the combination of a vessel, an actuating mechanism located wholly within the vessel, a dial, two indicating devices that coöperate with the dial to give the meter indications, a casing containing the dial and said devices which is independent of the vessel, and a magnetic means for transmitting movements of the actuating mechanism to one of said indicating devices.

38. In a fluid meter, the combination of a vessel, an actuating mechanism located wholly within the vessel, a dial, two indicating devices that coöperate with the dial to give the meter indications, an angularly adjustable casing which is independent of the vessel and contains the dial and indicating devices, a clamp for securing the casing in position, a magnetic means for transmitting movements of the actuating mechanism to one of said devices, and a means accessible from the outside of the casing and extending through a wall thereof to move the other indicating device.

39. In a fluid meter, the combination of a vessel, an actuating mechanism located wholly within the vessel, a dial, two indicating devices that coöperate with the dial to give the meter indications, a casing containing the dial and said devices which is independent of the vessel, a magnetic means for transmitting movements of the actuating mechanism to one of said indicating devices, a means located external to the front wall of the casing and extending therethrough for actuating the other device, and a support for said means.

40. In a meter for measuring the flow of fluids, the combination of means for creating a pressure difference that bears a definite relation to the rate of flow, a closed vessel having chambers of unequal size that contain a body of liquid that is acted upon by the pressure difference, conduits connecting the chambers with said means, a float in the smaller chamber whose position is determined by the movement of the liquid, a pivotally mounted member arranged outside of the vessel, a pivotally mounted member arranged in the upper part of the smaller chamber and adjacent to the first member, magnetic means for transmitting motion from one member to the other, and a connection between the float and the member in its chamber.

41. In a meter for measuring the flow of fluids, the combination of means for creating a pressure difference that bears a definite relation to the rate of flow, a closed vessel having communicating chambers therein that contain a substantially U-shaped body of liquid that is acted upon by the pressure difference, conduits connecting the chambers with said means, a float that rides on the liquid in one chamber, a horizontal spindle mounted in the upper part of said chamber, a magnet carried by the spindle and arranged within said chamber adjacent to the outer wall of the vessel, a pivotally mounted magnetic member arranged at the opposite side of said wall, the member being moved by the magnet, a device that is controlled by said member, and means for transmitting the movement of the float to the spindle.

42. In a meter for measuring the flow of fluids, the combination of means for creating a pressure difference that bears a definite relation to the rate of flow, a closed vessel having walls that form a relatively large chamber in its base and a smaller chamber extending upwardly from the base, the lower end of the wall of the smaller chamber projecting downward into the larger chamber and both chambers containing a body of liquid, conduits connecting the chambers with said means, a float that rides on the liquid in the smaller chamber, a magnet rotatably mounted in the upper part of the smaller chamber and arranged adjacent to the wall of said chamber, a rotatably mounted magnetic member arranged outside of the wall and adjacent to the magnet, a device that is moved by the member, and means for transmitting motion from the float to the magnet.

In witness whereof, I have hereunto set my hand this 9th day of March, 1909.

AUSTIN R. DODGE.

Witnesses:
HELEN ORFORD,
F. A. HURD.

---

Corrections in Letters Patent No. 1,087,931.

It is hereby certified that in Letters Patent No. 1,087,931, granted February 24, 1914, upon the application of Austin R. Dodge, of Schenectady, New York, for an improvement in "Meters for Measuring the Flow of Liquids," errors appear in the printed specification requiring correction as follows: Page 2, line 3, first occurrence, for the word "of" read *in;* page 6, line 21, for the word "to" read *and;* page 9, line 114, before the word "drum" strike out the article "the"; page 9, lines 106, 116, and 130, and page 10, lines 15, 30, and 40, after the word "agent" insert a comma; and that the said Letters Patent should be read with these corrections therein that the same may conform to the record of the case in the Patent Office.

Signed and sealed this 24th day of March, A. D., 1914.

[SEAL.]

J. T. NEWTON,
*Acting Commissioner of Patents.* with said means, a float that rides on the liquid in one chamber, a horizontal spindle mounted in the upper part of said chamber, a magnet carried by the spindle and arranged within said chamber adjacent to the outer wall of the vessel, a pivotally mounted magnetic member arranged at the opposite side of said wall, the member being moved by the magnet, a device that is controlled by said member, and means for transmitting the movement of the float to the spindle.

42. In a meter for measuring the flow of fluids, the combination of means for creating a pressure difference that bears a definite relation to the rate of flow, a closed vessel having walls that form a relatively large chamber in its base and a smaller chamber extending upwardly from the base, the lower end of the wall of the smaller chamber projecting downward into the larger chamber and both chambers containing a body of liquid, conduits connecting the chambers with said means, a float that rides on the liquid in the smaller chamber, a magnet rotatably mounted in the upper part of the smaller chamber and arranged adjacent to the wall of said chamber, a rotatably mounted magnetic member arranged outside of the wall and adjacent to the magnet, a device that is moved by the member, and means for transmitting motion from the float to the magnet.

In witness whereof, I have hereunto set my hand this 9th day of March, 1909.

AUSTIN R. DODGE.

Witnesses:
HELEN ORFORD,
F. A. HURD.

---

Corrections in Letters Patent No. 1,087,931.

It is hereby certified that in Letters Patent No. 1,087,931, granted February 24, 1914, upon the application of Austin R. Dodge, of Schenectady, New York, for an improvement in "Meters for Measuring the Flow of Liquids," errors appear in the printed specification requiring correction as follows: Page 2, line 3, first occurrence, for the word "of" read *in;* page 6, line 21, for the word "to" read *and;* page 9, line 114, before the word "drum" strike out the article "the"; page 9, lines 106, 116, and 130, and page 10, lines 15, 30, and 40, after the word "agent" insert a comma; and that the said Letters Patent should be read with these corrections therein that the same may conform to the record of the case in the Patent Office.

Signed and sealed this 24th day of March, A. D., 1914.

[SEAL.]

J. T. NEWTON,
*Acting Commissioner of Patents.*

It is hereby certified that in Letters Patent No. 1,087,931, granted February 24, 1914, upon the application of Austin R. Dodge, of Schenectady, New York, for an improvement in "Meters for Measuring the Flow of Liquids," errors appear in the printed specification requiring correction as follows: Page 2, line 3, first occurrence, for the word "of" read *in;* page 6, line 21, for the word "to" read *and;* page 9, line 114, before the word "drum" strike out the article "the"; page 9, lines 106, 116, and 130, and page 10, lines 15, 30, and 40, after the word "agent" insert a comma; and that the said Letters Patent should be read with these corrections therein that the same may conform to the record of the case in the Patent Office.

Signed and sealed this 24th day of March, A. D., 1914.

[SEAL.]
J. T. NEWTON,
*Acting Commissioner of Patents.*